United States Patent
Cady et al.

(10) Patent No.: US 9,311,340 B2
(45) Date of Patent: Apr. 12, 2016

(54) MULTIPLE PARTIAL-IMAGE COMPOSITIONAL SEARCHING

(71) Applicant: International Business Machines Corporation, Armonk, NY (US)

(72) Inventors: Kimberly H. Cady, Raleigh, NC (US); Scott B. Greer, Essex Junction, VT (US); Andrew J. Lavery, Austin, TX (US); Sarah R. Plantenberg, San Francisco, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 50 days.

(21) Appl. No.: 14/253,176

(22) Filed: Apr. 15, 2014

(65) Prior Publication Data
US 2015/0294185 A1 Oct. 15, 2015

(51) Int. Cl.
*G06K 9/66* (2006.01)
*G06F 17/30* (2006.01)
*G06K 9/46* (2006.01)
*G06K 9/62* (2006.01)
*G06Q 30/06* (2012.01)

(52) U.S. Cl.
CPC ...... *G06F 17/30268* (2013.01); *G06F 17/3028* (2013.01); *G06F 17/30256* (2013.01); *G06F 17/30277* (2013.01); *G06K 9/46* (2013.01); *G06K 9/6202* (2013.01); *G06Q 30/0643* (2013.01); *G06K 2009/4666* (2013.01)

(58) Field of Classification Search
USPC ................. 382/195, 282, 284, 303, 305, 307; 358/538, 452
See application file for complete search history.

(56) References Cited

U.S. PATENT DOCUMENTS

| | | | | |
|---|---|---|---|---|
| 6,597,806 | B1* | 7/2003 | Kawada | G06K 9/32 382/151 |
| 7,487,144 | B2* | 2/2009 | Shakib et al. | |
| 7,515,810 | B2* | 4/2009 | Nagasaka et al. | 386/248 |
| 7,545,977 | B2* | 6/2009 | Ikeda et al. | 382/165 |
| 7,620,629 | B2* | 11/2009 | Tanaka | G06F 17/30265 |
| 7,890,486 | B2* | 2/2011 | Claghorn | G06F 17/30011 707/705 |
| 7,933,887 | B2* | 4/2011 | Tanaka | 707/706 |
| 8,144,238 | B2* | 3/2012 | Kotake et al. | 348/349 |
| 8,315,442 | B2 | 11/2012 | Gokturk et al. | |

(Continued)

OTHER PUBLICATIONS

IBM, List of IBM Patents or Patent Applications Treated as Related, Applicant Appendix, Jun. 10, 2015, pp. 1-2, the contents of which are incorporated herein by reference in their entirety.

(Continued)

*Primary Examiner* — Yosef Kassa
(74) *Attorney, Agent, or Firm* — Lee Law, PLLC; Christopher B. Lee

(57) ABSTRACT

Multiple partial-image selections are received. Each of the multiple partial-image selections includes a user-selected portion of one of a group of images. Partial-image search criteria are derived from a combination of the multiple partial-image selections. A search is performed for images that correspond to the partial-image search criteria derived from the combination of the multiple partial-image selections. Visual search results are returned. The visual search results include at least one identified image that includes features that correspond to the partial-image search criteria derived from the combination of the multiple partial-image selections.

13 Claims, 11 Drawing Sheets

(56) References Cited

U.S. PATENT DOCUMENTS

| | | | |
|---|---|---|---|
| 8,345,982 B2 | 1/2013 | Gokturk et al. | |
| 8,392,842 B1 | 3/2013 | Lorenz et al. | |
| 8,600,194 B2* | 12/2013 | Doepke | G06T 3/4038 345/36 |
| 8,650,220 B2* | 2/2014 | Rohlf | G06F 17/30241 345/653 |
| 8,866,908 B2* | 10/2014 | Chishima et al. | 348/149 |

OTHER PUBLICATIONS

Author Unknown, Canvasee: Enjoy Shopping with Visual Search Function, Webpage/site, 2013, p. 1, G&G Commerce, Ltd., Published online at: http://canvasee.com/.

Author Unknown, Chic Engine: Fashion Search Engine for the Fashion 2.0 World, Webpage/site, 2012, pp. 1-2, ShiftyBits, LLC, Published online at: http://www.chicengine.com/.

Author Unknown, Google Shopping, Webpage/site, 2014, p. 1, Google, Inc., Published online at: http://www.google.com/shopping.

Author Unknown, Like.com: Visual Search Matches Shoes, Bags and Dresses, Webpage/site, 2008, pp. 1-5, Lifehacker.com, Published online at: http://lifehacker.com/5078949/likecom-visual-search-matches-shoes-bags-and-dresses.

Jonathan Allen, Chic Engine Helps You Find That Dress You Saw on Pinterest, Webpage/site, Jul. 12, 2012, pp. 1-4, Incisive Interactive Marketing LLC, Published online at: http://searchenginewatch.com/article/2190993/Chic-Engine-Helps-You-Find-That-Dress-You-Saw-on-Pinterest.

Jingyu Cui, et al., IntentSearch: Interactive On-line Image Search Re-ranking, Proceedings of the 16th ACM International Conference on Multimedia, Oct. 26, 2008, pp. 997-998, Association for Computing Machinery, Published online at: http://citeseerx.ist.psu.edu/viewdoc/summary;jsessionid=D849D307B1B8E817FBE0A3D718B3DEF2?doi=10.1.1.408.1885.

Hu Shengjie, Region-Based Partial-Duplicate Image Retrieval, 2012 International Conference on Industrial Control and electronics Engineering (ICICEE), Aug. 23, 2012, pp. 1521-1524, IEEE, Published online at: http://ieeexplore.ieee.org/stamp/stamp.jsp?tp=&arnumber=6322690.

Roelof Van Zwol, et al., Faceted Exploration of Image Search Results, Proceedings of the 19th International Conference on World Wide Web, Apr. 26, 2010, pp. 961-970, IW3C2 & Association for Computing Machinery, Published online at: http://labs.yahoo.com/files/wfp0649-vanzwol.pdf.

* cited by examiner

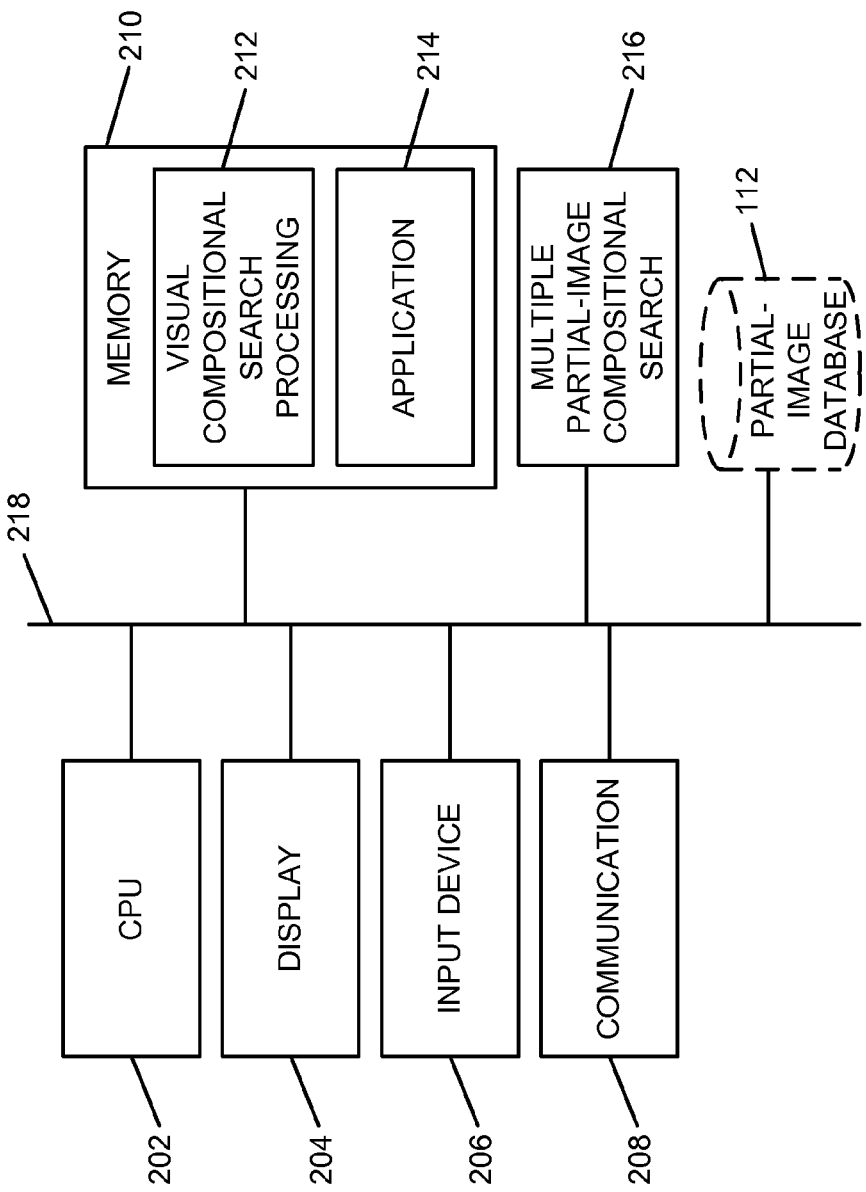

MULTIPLE PARTIAL-IMAGE COMPOSITIONAL SEARCHING

BACKGROUND

The present invention relates to information searches. More particularly, the present invention relates to multiple partial-image compositional searching.

Information searches may be performed by users via a network, such as the Internet. To initiate a search for information, users conventionally type one or more search terms into a web browser using a keyboard. The search terms are typed into the web browser by the user in the user's native written language. The results of the search are also returned to the user in the user's native written language so that the user may interpret and review the search results.

BRIEF SUMMARY

A method includes: receiving, by a processor, multiple partial-image selections that each comprise a user-selected portion of one of a plurality of images; deriving partial-image search criteria from a combination of the multiple partial-image selections; performing a search for images that correspond to the partial-image search criteria derived from the combination of the multiple partial-image selections; and returning visual search results that comprise at least one identified image that comprises features that correspond to the partial-image search criteria derived from the combination of the multiple partial-image selections.

A system includes a display, and a processor programmed to: receive multiple partial-image selections that each comprise a user-selected portion of one of a plurality of images; derive partial-image search criteria from a combination of the multiple partial-image selections; perform a search for images that correspond to the partial-image search criteria derived from the combination of the multiple partial-image selections; and return, via the display, visual search results that comprise at least one identified image that comprises features that correspond to the partial-image search criteria derived from the combination of the multiple partial-image selections.

A computer program product includes a computer readable storage medium having computer readable program code embodied therewith, where the computer readable program code when executed on a computer causes the computer to: receive multiple partial-image selections that each comprise a user-selected portion of one of a plurality of images; derive partial-image search criteria from a combination of the multiple partial-image selections; perform a search for images that correspond to the partial-image search criteria derived from the combination of the multiple partial-image selections; and return visual search results that comprise at least one identified image that comprises features that correspond to the partial-image search criteria derived from the combination of the multiple partial-image selections.

BRIEF DESCRIPTION OF THE SEVERAL VIEWS OF THE DRAWINGS

FIG. 2 is a block diagram of an example of an implementation of a core processing module capable of performing multiple partial-image compositional searching according to an embodiment of the present subject matter;

DETAILED DESCRIPTION

Figure 1:
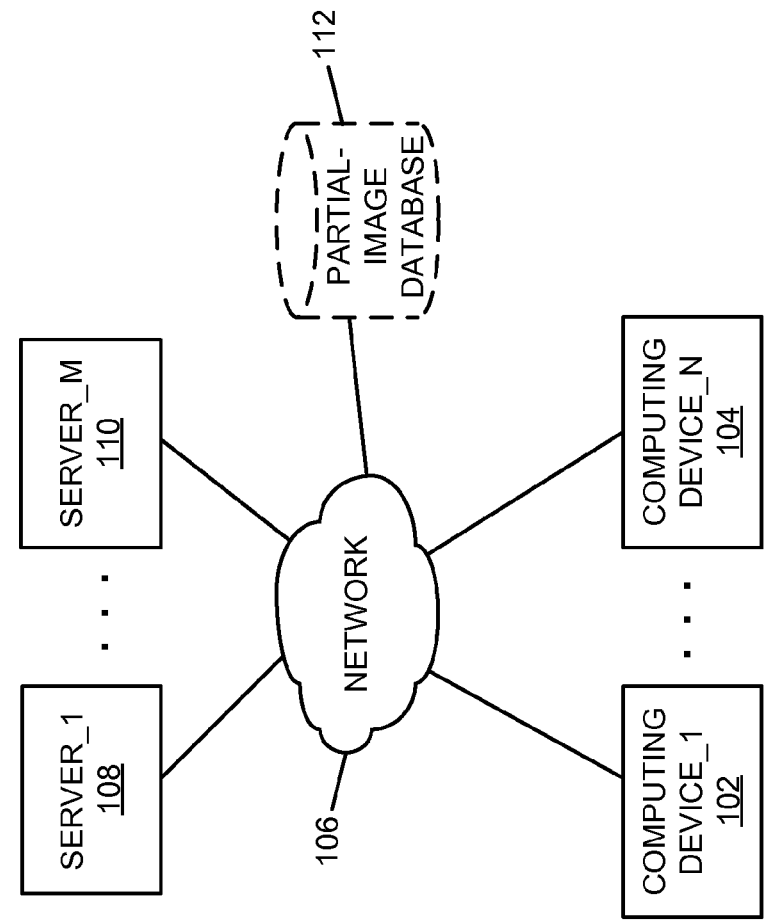
FIG. 1 is a block diagram of an example of an implementation of a system for multiple partial-image compositional searching according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides multiple partial-image compositional searching. The present technology provides a visually-oriented search interface that allows users to visually identify and visually refine information searches by selecting portions/parts of multiple images that each specify visually-selected search criteria. The present technology also evaluates the selected portion(s) of each of the multiple images and may determine text-based identifications (nomenclature) appropriate for searching from the visually-selected search criteria. The user may be presented with a search listing of the visually-selected search criteria or the determined nomenclature. The user may re-order the visually-selected search criteria within the search listing to relatively re-prioritize the search listing and/or may use graphical ratings/preference indicators (e.g., hearts, diamonds, asterisks, highlighting, etc.) to convey relative importance (e.g., "must have," "nice have", "preferred," etc.) of the respective partial images as search criteria. The visually-selected and prioritized/rated search criteria may be provided to a search engine or other server to invoke an informational search, and visual search results that correspond to the search criteria may be returned to the user.

As such, users may visually mash-up multiple, possibly unrelated, portions of visual search results into a new complex search that provides a fundamentally different kind of search experience for the user. The present technology provides direct-user selection of visual criteria and maps the visually-selected search criteria to search engine information processing capabilities. By use of the present technology, information searches are not impeded by subjective language-based or text-based interpretations of items of interest, and users may more rapidly derive meaningful search results without having to speculate as to how to specify a particular search term or how a search engine may interpret the user's interpretations of language choices.

Additionally, the determined nomenclature of the content within the respective portions of images specified for the visually-selected search criteria may further assist users with learning terminology that is used within a given informational domain that is associated with a visually-selected set of search criteria. As such, the present technology may provide information domain terminology guidance, such as helping users to learn domain-specific terminology and/or languages, in addition to providing visual configuration of searches.

It should be noted that conception of the present subject matter resulted from recognition of certain limitations associated with conventional text-based and written language-based searching. For example, it was observed that the conventional user experience (UX) of searching for information is text-based and written language centric, and that this form of searching relies upon written search terms (e.g., text terms or text strings) entered by the user in the user's native written language. It was further observed that users may not know the terminology associated with the information/domain for which they are searching or that users may lack language skills in the written language within which the search terms must be entered into conventional text-based search engines. It was further observed that within this context, a user must iteratively read written search results returned by search engines to determine whether the search term(s) entered by the user adequately conveyed the user's intended search to the search engine. Additionally, it was observed that because of language selection for search terms being specified by users and potential mis-matches with terminology used within different information domains, search results often do not correlate well with a user's intended searching. It was additionally observed that users must refine the text-based search string by guessing how the search engine is interpreting their intended text-based search strings. The users must then manually refine the text-based search strings through trial and error in an attempt to determine how the search engine may be used to return improved search results that are more consistent with the user's intended searching. In view of these several observations, it was determined that the human factors interface design of conventional text-based and written language-based searching is in need of a fundamental change to allow users to specify searches without needing to know the terminology of the particular informational domain. It was further determined that an image-based search that allows users to select portions of multiple images (multiple partial-images) to specify visually-selected search criteria would allow users to be free of language-based limitations in searching, and would assist with rapid search specification and search refinement. It was additionally determined that image-based compositional searching from multiple partial images may assist users with learning language(s), in addition to learning terminology that is used within a particular informational domain within which the user is searching. The present subject matter improves information searching by providing for image-based multiple partial-image compositional searching, as described above and in more detail below. As such, improved information searching may be obtained through use of the present technology.

The multiple partial-image compositional searching described herein may be performed in real time to allow prompt image-based search composition from portions of multiple images. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for multiple partial-image compositional searching. A computing device_1 102 through a computing device_N 104 communicate via a network 106 with several other devices. The other devices include a server_1 108 through a server_M 110. A partial-image database 112 provides processing, correlation, and storage of partial-image correlations with search nomenclature. It should be noted that the partial-image database 112 is illustrated within the drawing figures as a dashed-line component to convey that the partial-image database 112 may be considered an optional component within the system 100. It should further be noted that the respective server_1 108 through the server_M 110 may provide image-based information appropriate for the respective images provided by the respective servers (e.g., text descriptions and other information associated with products for sale, etc.). As such, individual servers that provide images may also provide text descriptions of the respective images from which search terms may be extracted. Accordingly, all references herein to the partial-image database 112 may be considered to be implementable using an actual database or may be implemented in any other manner appropriate for a given implementation, and all such implementation possibilities are considered within the scope of the present subject matter.

As will be described in more detail below in association with FIG. 2 through FIG. 5D, the computing device_1 102 through the computing device_N 104 and the server_1 108 through the server_M 110 may each provide automated multiple partial-image compositional searching. For example, the computing device_1 102 through the computing device_N 104 represent user devices that may be used by users to design and to invoke multiple partial-image compositional search requests. One or more of the computing device_1 102 through the computing device_N 104 and/or one or more of the server_1 108 through the server_M 110 may host search engines that respond to multiple partial-image compositional search requests. Additionally, one or more of the server_1 108 through the server_M 110 may represent information hosts, such as servers, databases, and/or web site host devices, that host information that may be searched in response to multiple partial-image compositional search requests. As such, the present technology may be implemented at a user computing device or server device level. A variety of possibilities exist for implementation of the present subject matter, and all such possibilities are considered within the scope of the present subject matter.

The partial-image database 112 may be populated with partial-image search term nomenclature pairs/correlations in real time as multiple partial-image searches are being processed through image recognition, edge detection, or other technologies. Alternatively, the partial-image database 112 may be populated using metadata associated with images and identifiable/selectable portions of images. As another alternative, descriptions of items associated with images (e.g., a description of the image) may be parsed in real time to determine appropriate nomenclature for searching. Many other possibilities exist for construction, maintenance, and processing associated with the partial-image database 112, and all such possibilities are considered within the scope of the present technology. The partial-image database 112 may include a relational database, an object database, or any other storage type of device. As such, the partial-image database 112 may be implemented as appropriate for a given implementation.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, application server, or other data server device, or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

FIG. 2 is a block diagram of an example of an implementation of a core processing module 200 capable of performing multiple partial-image compositional searching. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of multiple partial-image compositional searching in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes a visual compositional search processing area 212 that provides storage space for configuration and execution of multiple partial-image compositional searches within the core processing module 200. As will be described in more detail below, a user may configure a multiple partial-image compositional search and invoke searching based upon the configured visually-selected search criteria with a local or remote search engine. The search engine may execute the multiple partial-image compositional search and may return additional visual search results, as described in more detail below.

The memory 210 also includes an application area 214 that provides storage and execution space for one or more applications. The applications may include web browsers, web server applications, search engine applications, or other applications as appropriate for the respective implementation of the core processing module 200.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A multiple partial-image compositional search module 216 is also illustrated. The multiple partial-image compositional search module 216 provides visual search configuration and processing for the core processing module 200, as described above and in more detail below. The multiple partial-image compositional search module 216 implements the automated multiple partial-image compositional searching of the core processing module 200.

The multiple partial-image compositional search module 216 may be utilized to process user inputs of visually-selected search criteria, and to configure multiple partial-image compositional searches. The multiple partial-image compositional searches may be processed by the multiple partial-image compositional search module 216, or may be processed by a local or remote search engine. The respective search engine may return visual search results along with text-based nomenclature and/or metadata that identify respective portions of the images that may be selected by users for further searches. Alternatively, the multiple partial-image compositional search module 216 may implement image recognition or other technology that may be utilized to identify content within portions of images in response to user selection of portions of images for multiple partial-image compositional search configuration.

It should be noted that the text-based identifications of content within the respective portions of images associated with visually-selected search criteria may be provided to the users to assist users with learning terminology that is used within a given informational domain and that is associated with a visually-selected set of search criteria. As such, the present technology may provide information domain terminology guidance, such as helping users to learn domain-specific terminology or languages, in addition to providing visual configuration of searches.

It should also be noted that the multiple partial-image compositional search module 216 may form a portion of other circuitry described without departure from the scope of the present subject matter. Further, the multiple partial-image compositional search module 216 may alternatively be implemented as an application stored within the memory 210. In such an implementation, the multiple partial-image compositional search module 216 may include instructions executed by the CPU 202 for performing the functionality described herein. The CPU 202 may execute these instructions to provide the processing capabilities described above and in more detail below for the core processing module 200. The multiple partial-image compositional search module 216 may form a portion of an interrupt service routine (ISR), a portion of an operating system, a portion of a browser application, or a portion of a separate application without departure from the scope of the present subject matter.

The partial-image database 112 (again in dashed-line representation) is also shown associated with the core processing module 200 within FIG. 2 to show that the partial-image database 112 may be coupled to the core processing module 200 without requiring external connectivity, such as via the network 106.

The CPU 202, the display 204, the input device 206, the communication module 208, the memory 210, the multiple partial-image compositional search module 216, and the partial-image database 112 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the partial-image database 112 is illustrated as a separate component for purposes of example, the information stored within the partial-image database 112 may also/alternatively be stored within the memory 210 without departure from the scope of the present subject matter. Accordingly, the core processing module 200 may take many forms and may be associated with many platforms.

FIG. 3A through FIG. 3F described below represent an example user interface sequence that may be executed by devices, such as the core processing module 200, to perform the automated multiple partial-image compositional searching associated with the present subject matter. Several display areas that facilitate the multiple partial-image compositional searching are illustrated and described in detail below. Many other variations on the example user interface sequence are possible and all are considered within the scope of the present subject matter. The example user interface sequence may be rendered, such as by use of the display 204, and visually-selected search criteria selected by a user may be received by the input device 206. The visually-selected search criteria may be processed by modules, such as the multiple partial-image compositional search module 216 and/or executed by the CPU 202, associated with such devices to perform multiple partial-image compositional searching, as described herein.

It should be noted that while the present examples utilize clothing (e.g., items) to visually indicate clothing search criteria, the present technology is not limited to use in association with items. For example, portions of landscapes and images within landscape images (e.g., beaches, mountain bikes, and other generally unrelated images), may also be processed by use of the present technology, such as for searching for vacation locations or for other forms of visual partial-image-based searching, as appropriate for the given implementation. As such, any and all such implementations are considered to be within the scope of the present description.

Figure 3A:
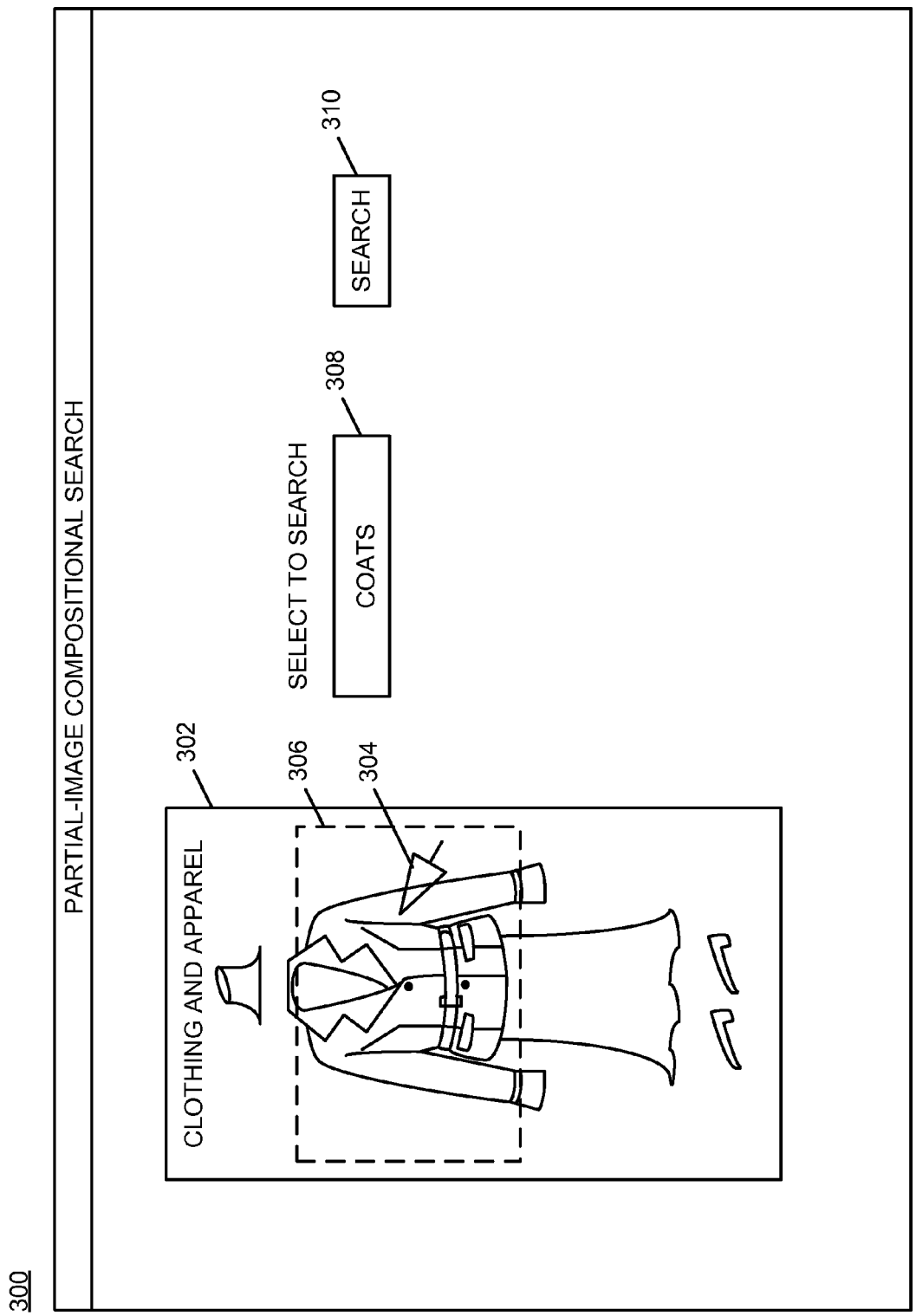
FIG. 3A is a diagram of an example of an implementation of a multiple partial-image compositional search interface in an initial state for receipt of user input to initiate multiple partial-image compositional searching according to an embodiment of the present subject matter.

FIG. 3A is a diagram of an example of an implementation of a multiple partial-image compositional search interface 300 in an initial state for receipt of user input to initiate multiple partial-image compositional searching. The multiple partial-image compositional search interface 300 is represented as a graphical user interface (GUI) that allows user selection of portions of multiple images from which visually-selected search criteria may be compiled, prioritized, relatively ranked, and processed to obtain visual search results.

As can be seen from FIG. 3A, an initial selection pane 302 titled "CLOTHING AND APPAREL" is designated and is provided for user selection of partial images for searching. As can also be seen from FIG. 3A, several elements of clothing are depicted graphically for selection as partial images by users to begin partial-image compositional searching. For purposes of the present example, an illustration of a person or mannequin is not illustrated for ease of illustration purposes. However, it is understood that any image appropriate for a given implementation may be utilized and provided to a user for partial-image selection to initiate searching. It is further assumed for purposes of the present example that a user selects a partial image of a coat within the selection pane 302 using a mouse and pointer represented by a cursor 304. The partial-image selection of the coat within the selection pane 302 via the cursor 304 is illustrated within FIG. 3A as highlighted within the present example by a dashed partial-image selection box 306.

The partial-image selection by the user also causes automated population of a search text box 308 titled "SELECT TO SEARCH" with the search term "COATS." This search term and others described below may be captured by use of technology described in association with the partial-image database 112 above, and may be retrieved by query of terminology from the partial-image database 112 using the selected partial image(s). Alternatively, real-time processing for image recognition, edge detection, or other processing may be performed to derive appropriate metadata or terminology that identifies a particular portion of an image as appropriate for the given implementation. As another alternative, descriptions of items associated with images (e.g., a description of the image) may be parsed in real time to determine appropriate nomenclature for searching. As described above, the partial-image database 112 may be considered optional and may be implemented in any manner appropriate for a given implementation. As also described above, individual servers that provide images may provide text descriptions of the respective images from which search terms may be extracted. However, terminology derived in real time may also be stored in real time to build metadata for images, such as within the partial-image database 112, or otherwise as appropriate for a given implementation, to facilitate reuse of processing performed by the multiple partial-image compositional search interface 300.

Further, the user does not need to know the nomenclature associated with the item of interest to search the respective search engine (not shown). Instead, the multiple partial-image compositional search interface 300 automatically populates the appropriate search term on behalf of the user within the search text box 308. As such, not only may the user learn specific search term nomenclature to improve searching efficiency, but the user may also learn language. It is understood further understood that the present examples generate text strings for searching, and that these generated text strings may assist users with nomenclature and language skills It is also further understood that any language may be utilized for generation of the respective text strings and for searching as appropriate for a given implementation. As such, users may select different languages for searching so that the multiple partial-image compositional search interface 300 may be further utilized to support language education and searching servers that store information in different languages. Such a selection of language for searching may be selected using a menuing structure, profile, or otherwise as appropriate for a given implementation.

When the user is satisfied with the selected search criteria, the user may select the search button 310 to initiate a partial-image search using the multiple partial-image compositional search interface 300. For purposes of the present example it is assumed that the user selects the search button 310 to initiate searching for the selected search criteria "COATS."

Figure 3B:
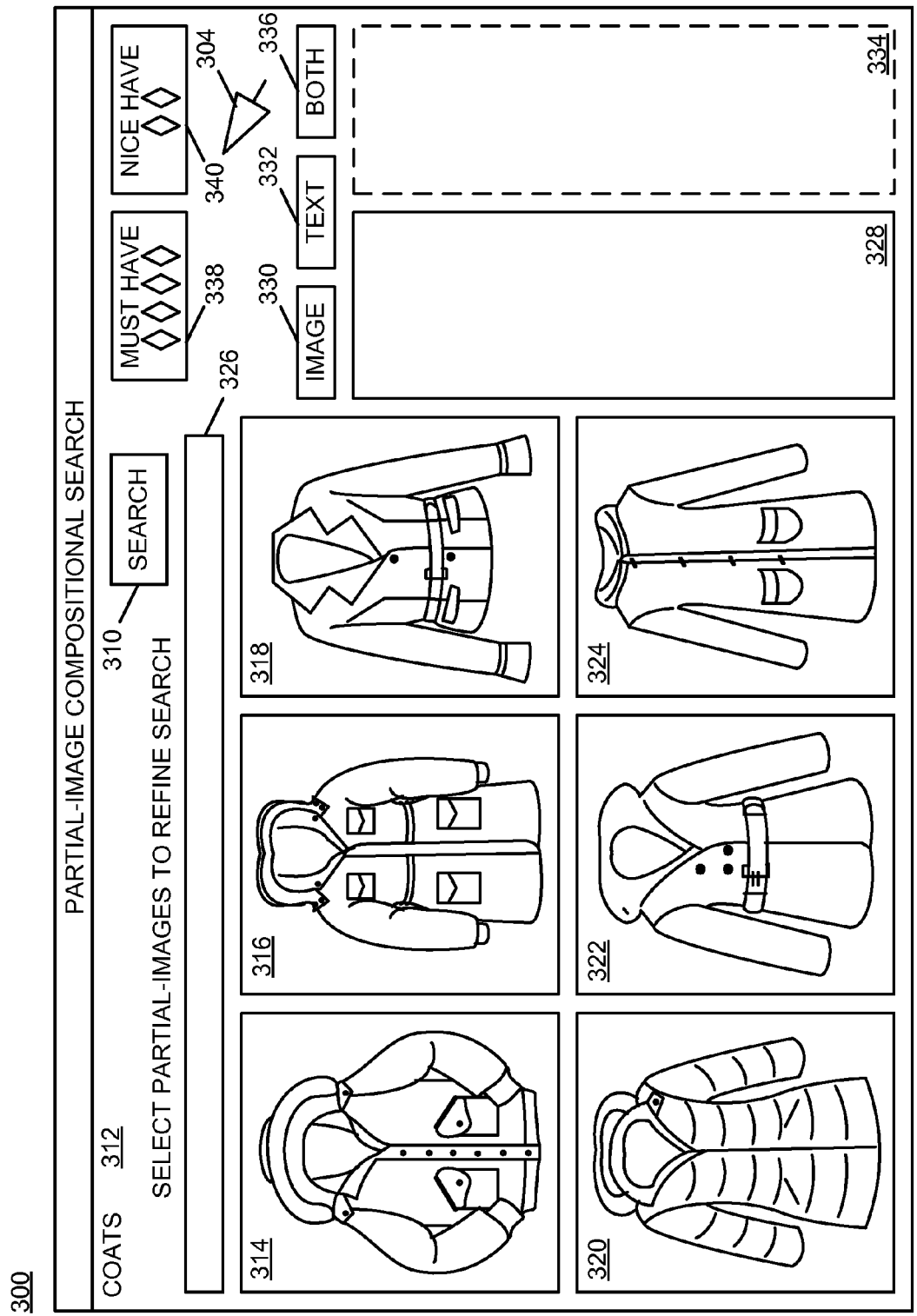
FIG. 3B is a diagram of an example of an implementation of the multiple partial-image compositional search interface of FIG. 3A in a subsequent state after initiation of a first-stage of multiple partial-image compositional searching according to an embodiment of the present subject matter.

FIG. 3B is a diagram of an example of an implementation of the multiple partial-image compositional search interface 300 of FIG. 3A in a subsequent state after initiation of a first-stage of multiple partial-image compositional searching. As can be seen from FIG. 3B, a "SELECT PARTIAL IMAGES TO REFINE SEARCH" dialog 312 titled "COATS" has been presented to the user that includes several coat images 314, 316, 318, 320, 322, and 324 that have been identified using the search for coats initiated in FIG. 3A. The user may select portions of the individual coat images 314 through 324 to further refine and search for a specific coat of interest. The search button 310 is again shown and may be selected to initiate a multiple partial-image search refinement, as described in more detail below.

A search text box 326 is initially empty to indicate that no portions of the coat images 314 through 324 have yet been selected by user via the cursor 304. Similarly, a partial-image search box 328 is also initially empty to indicate that no portions of the coat images 314 through 324 have yet been selected. As will be described beginning with FIG. 3C, the partial-image search box 328 will be populated with portions of images selected by a user to allow multiple partial-image compositional searching.

An image button 330 allows a user to cause the multiple partial-image compositional search interface 300 to display the partial-image search box 328. Similarly, a text button 332 allows the user to cause the multiple partial-image compositional search interface 300 to transform the contents of the partial-image search box 328 (once populated in response to user selections) into text search terms that are displayed in a partial-image text search box 334 so that the user may correlate the selected partial images with their respective individual search terms. For purposes of the present state of the example, the partial-image text search box 334 is represented as a dashed-line box to indicate that it is not currently displayed. As such, the present example of the multiple partial-image compositional search interface 300 defaults to partial-image based search refinement.

Using the image button 330 and the text button 332, the user may toggle between partial-image views within the partial-image search box 328 and text representations of the selected partial images within the partial-image text search box 334. Alternatively, the user may select a "BOTH" button 336 to display both the partial-image search box 328 and the partial-image text search box 334.

The multiple partial-image compositional search interface 300 also allows a user to graphically prioritize individual partial-image selections using partial-image search preference indicators 338 and 340. Only the two partial-image search preference indicators 338 and 340 are illustrated due to space limitations in the current drawings, though it is understood that additional partial-image search preference indicators may be configured as appropriate for a given implementation.

For purposes of the present example, the partial-image search preference indicator 338 may be used to identify a "must have" search preference as graphically illustrated using four diamond shapes within the present example. Similarly, the partial-image search preference indicator 340 may be used to identify a "nice have" search preference as graphically illustrated using two diamond shapes within the present example. As such, a user may specify preferences and priorities using graphical selection of partial images as described in more detail below. Additionally, while diamonds are utilized in the present example, it should be noted that other forms of graphical ratings may be utilized as appropriate for a given implementation. For example, graphical rating indicators, such as hearts, asterisks, highlighting, or other forms of graphical indicators may be utilized without departure from the scope of the present technology.

Figure 3C:
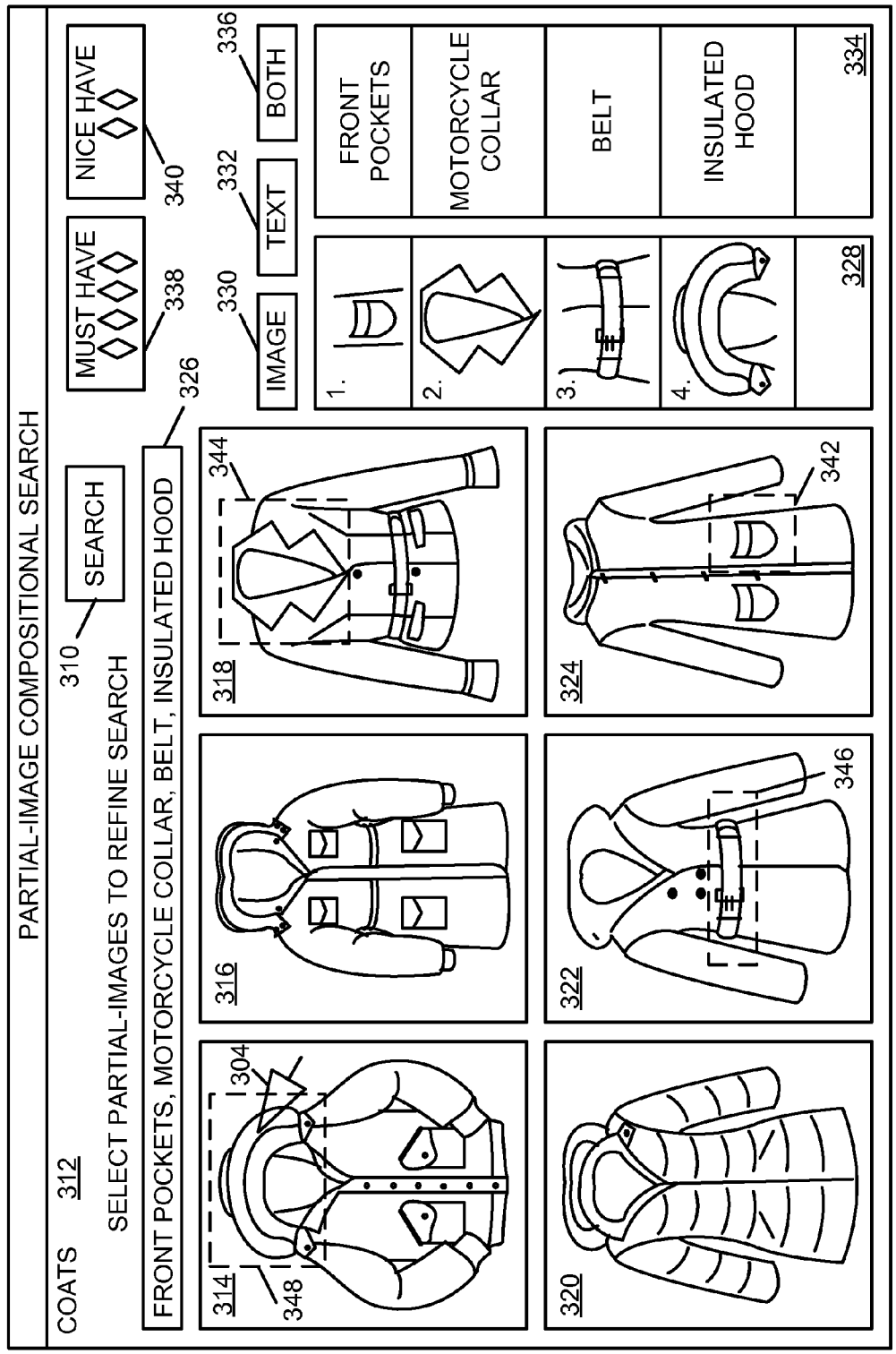
FIG. 3C is a diagram of an example of an implementation of the multiple partial-image compositional search interface of FIG. 3B in a subsequent state after user selection of several partial images in association with multiple partial-image compositional searching according to an embodiment of the present subject matter.

FIG. 3C is a diagram of an example of an implementation of the multiple partial-image compositional search interface 300 of FIG. 3B in a subsequent state after user selection of several partial images in association with multiple partial-image compositional searching. As can be seen from FIG. 3C, four partial images have been populated within the partial-image search box 328. The four partial images are labeled one (1.), two (2.), three (3.), and four (4.) to illustrate the respective order of selection by the user using the cursor 304.

As can also be seen from FIG. 3C, a set of dashed-line selection boxes 342, 344 346, and 348 are illustrated. The set of dashed-line selection boxes 342, 344 346, and 348 identify portions of the respective coat images 314 through 324 that have been selected by the user. The cursor 304 is positioned over the coat image 314 to illustrate that the user does not drag selection boxes using the cursor, but instead the respective dashed-line selection box will automatically identify the relevant portion of the image that has been selected for further searching.

Additionally, search text box 326 is been populated in sequence with text search term identifiers that represent the selected partial images. As such, the user may learn the respective search terms in association with selection of portions of the respective images. For purposes of the present example, it can be seen that the user has learned from the search text box 326 of the multiple partial-image compositional search interface 300 that the four partial images one (1.) through four (4.) are termed for search purposes "front pockets," "motorcycle collar," "belt," and "insulated hood," respectively. As such, the multiple partial-image compositional search interface 300 further reinforces search terminology and language education for the user by presenting a variety of different coats to the user for further search refinement and search terminology identification using multiple partial-image selection.

It should additionally be noted that the partial-image text search box 334 has been populated with text representations of the respective partial images. This indicates that the user has selected the "BOTH" button 336 to cause the multiple partial-image compositional search interface 300 to display both partial images and the text representations of those partial images. Additionally, the partial-image text search box 334 is shown in a solid-line representation to show that it is active within the present state of the current example. Further, the partial-image search box 328 and the partial-image text search box 334 have been resized to accommodate the text within the present example. The text representations within the partial-image text search box 334 are omitted from subsequent drawing figures due to space limitations within the drawings. However, it is understood that the text representations may be utilized as desired by user of the multiple partial-image compositional search interface 300, and as appropriate for a given implementation.

Figure 3D:
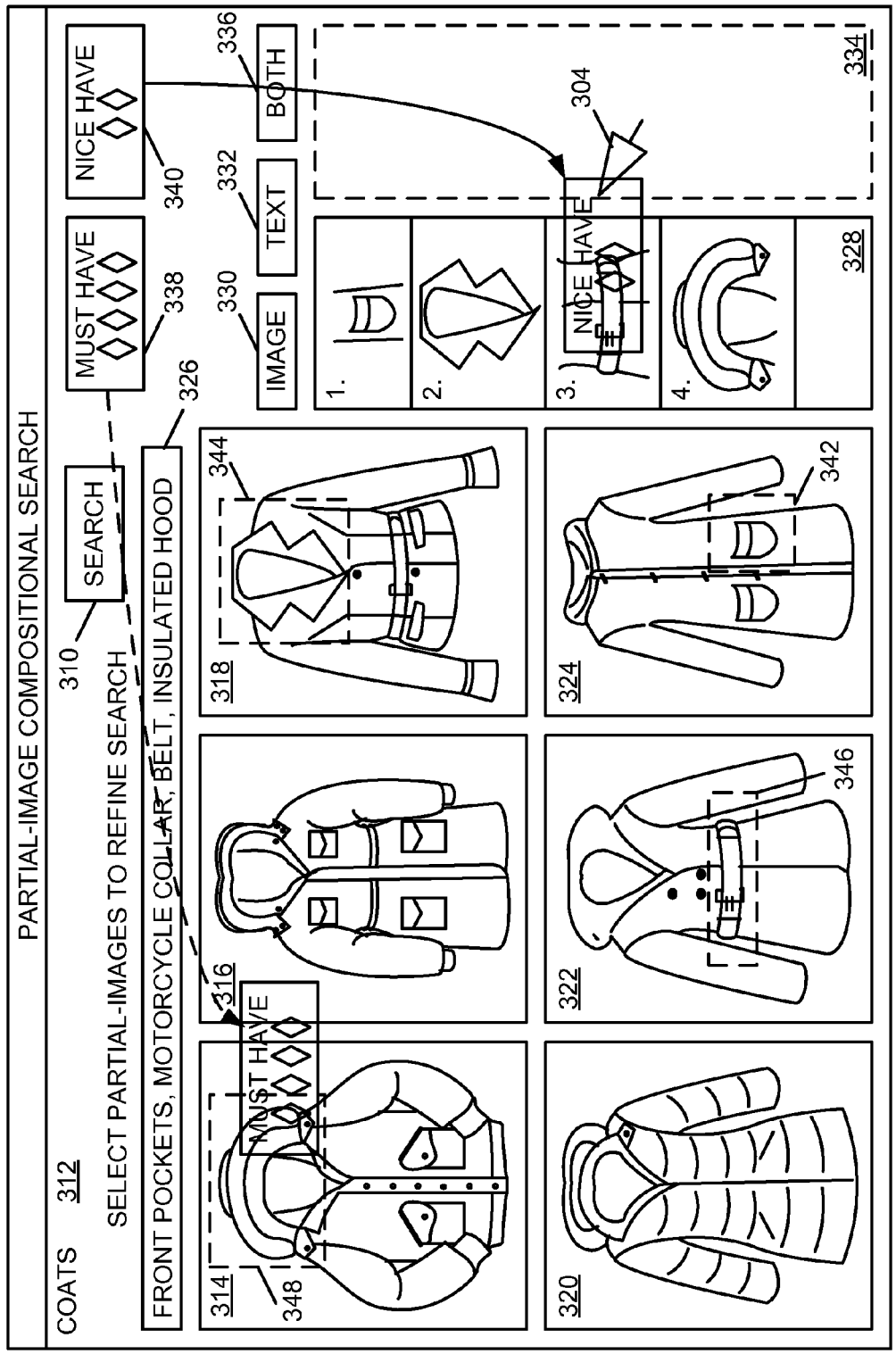
FIG. 3D is a diagram of an example of an implementation of the multiple partial-image compositional search interface of FIG. 3C in a subsequent state after user prioritization of several partial images initially selected in association with multiple partial-image compositional searching according to an embodiment of the present subject matter.

FIG. 3D is a diagram of an example of an implementation of the multiple partial-image compositional search interface 300 of FIG. 3C in a subsequent state after user prioritization of the several partial images initially selected in association with multiple partial-image compositional searching. As can be seen from FIG. 3D, the user has dragged the partial-image search preference indicator 338 ("must have") onto the insulated hood partial-image represented within the dashed-line selection box 348 (represented by a dashed line arrow to represent the first prioritization by the user). Similarly, the user has dragged the partial-image search preference indicator 340 ("nice have") onto the belt partial-image represented within the partial-image search box 328.

As such, the user may drag the respective search preference indicators onto the actual images from which the partial images were selected or may drag the respective search preference indicators onto the partial-image search box representations of the partial images. The user may further drag and rearrange/reorder the respective partial images within the partial-image search box 328 to prioritize further searching. It should additionally be noted that where the partial-image text search box 334 displays the respective text representations of the partial images (not shown due to space limitations in the drawing), a user may also drag and rearrange/reorder respective search terms to prioritize further searching.

The user may further delete partial-image item selections from the search refinement at any of the selected or identified locations (e.g., from the dashed-line selection boxes 342, 344 346, and 348, from the search text box 326, from the partial-image search box 328, or from the partial-image text search box 334). This deletion may be performed for example, either using a right-click pop-up menuing delete feature, or may be performed otherwise as appropriate for the given implementation.

Figure 3E:
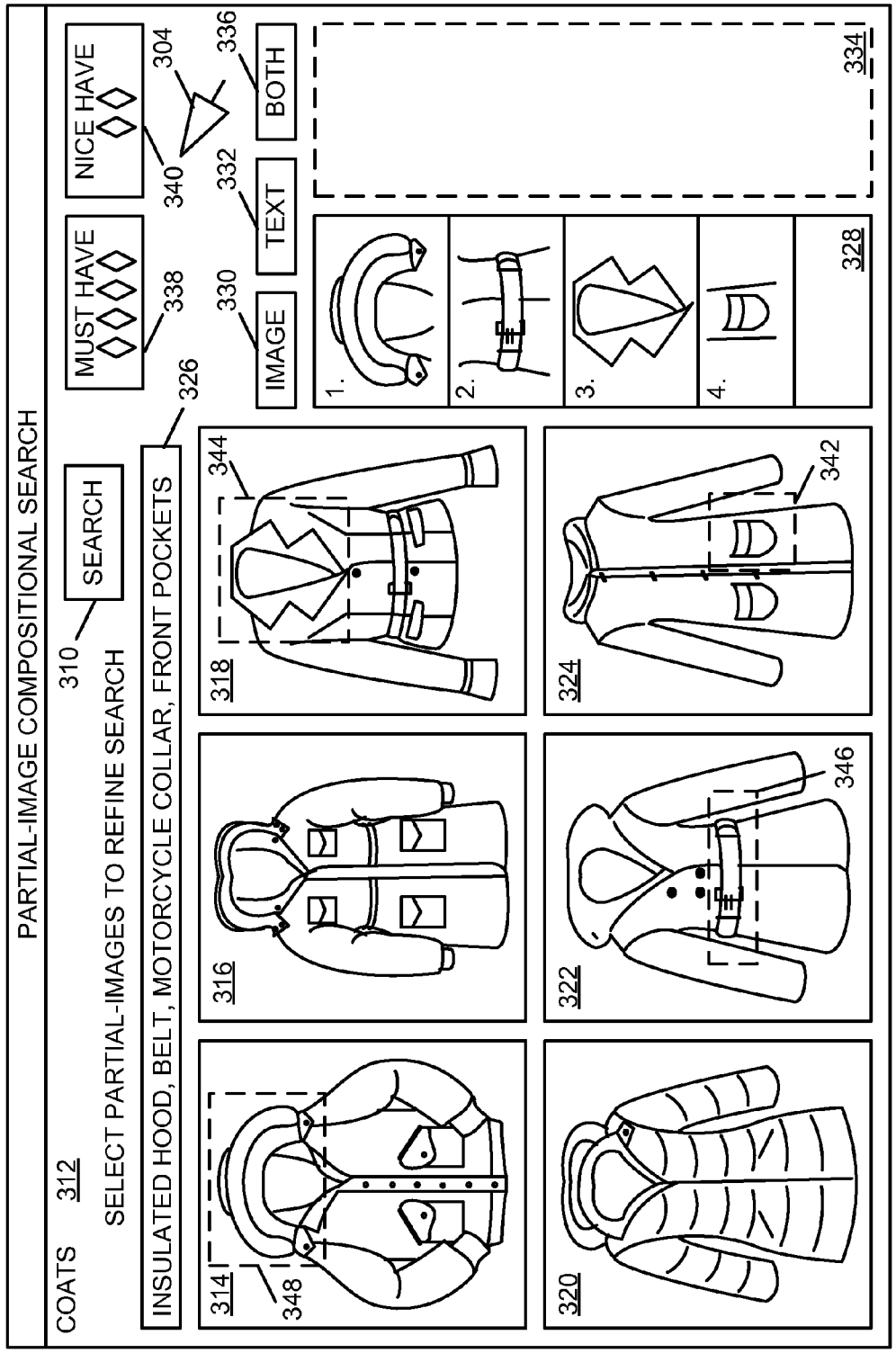
FIG. 3E is a diagram of an example of an implementation of the multiple partial-image compositional search interface of FIG. 3D in a subsequent state after user reprioritization of the several partial images initially displayed in association with multiple partial-image compositional searching according to an embodiment of the present subject matter.

FIG. 3E is a diagram of an example of an implementation of the multiple partial-image compositional search interface 300 of FIG. 3D in a subsequent state after user re-prioritization of the several partial images initially displayed in association with multiple partial-image compositional searching. As can be seen from FIG. 3E, the relative rankings of the partial-image search criteria have been reordered within the partial-image search box 328.

As such, the four partial images within the partial-image search box 328 have been reordered and relabeled as one (1.) "insulated hood," two (2.) "belt," three (3.) "motorcycle collar," and four (4.) "front pockets" to illustrate the respective reordering of selection by the user using the cursor 304. Further, the text identifiers that represent the selected partial images have also been reordered within the search text box 326 in response to the user reprioritization of the multiple selected partial images. For purposes of the present example, it is assumed that the user is satisfied with the search selections and the reprioritized order and has selected the search button 310.

Figure 3F:
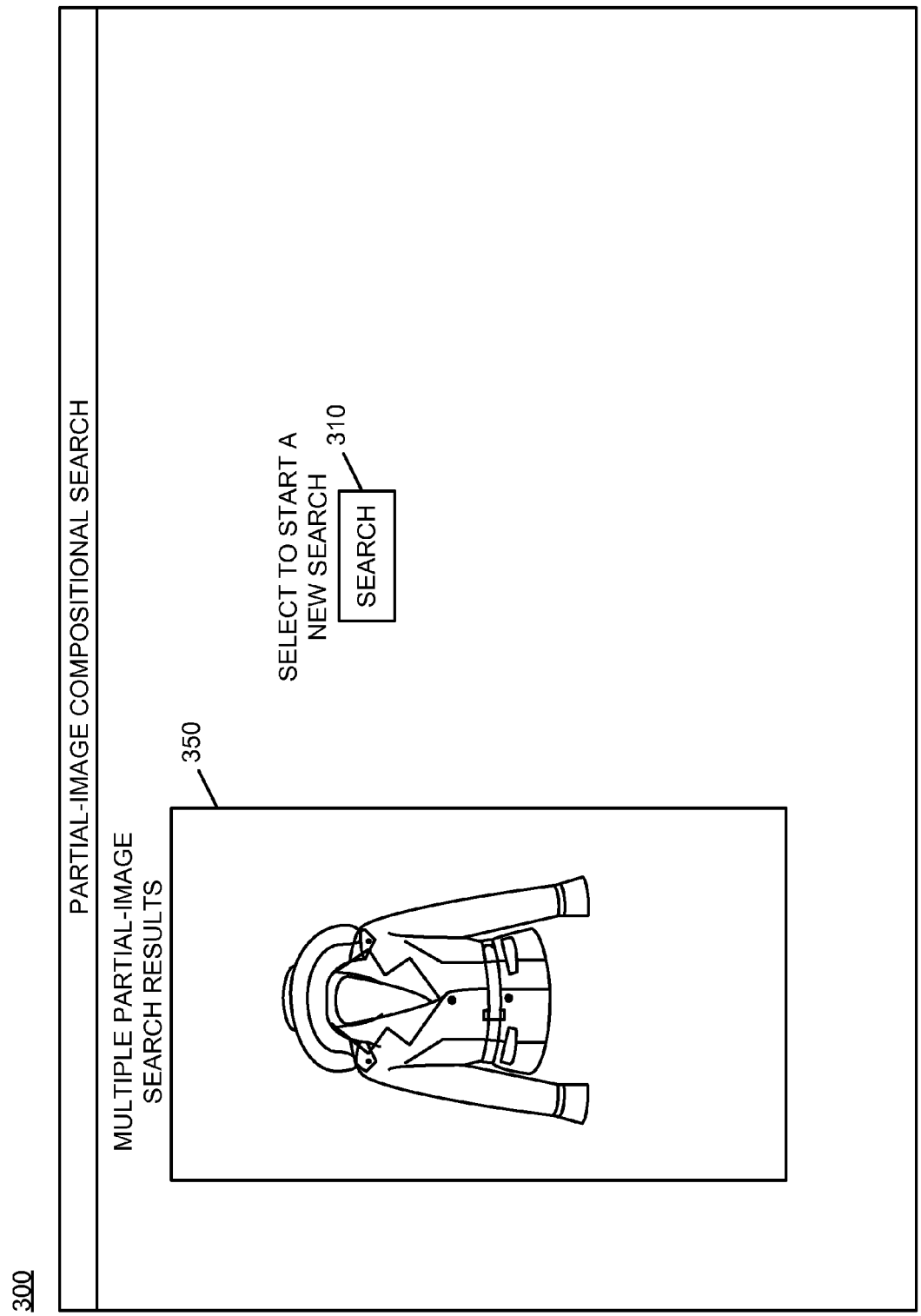
FIG. 3F is a diagram of an example of an implementation of the multiple partial-image compositional search interface of FIG. 3E in a subsequent state after the user has selected a search button to invoke multiple partial-image compositional searching according to an embodiment of the present subject matter.

FIG. 3F is a diagram of an example of an implementation of the multiple partial-image compositional search interface 300 of FIG. 3E in a subsequent state after the user has selected the search button 310 to invoke multiple partial-image compositional searching. As can be seen from FIG. 3F, a search results pane 350 displays a single image of a coat that matches and/or corresponds to all of the specified search criteria. As can be seen from FIG. 3F, the identified coat that matches and/or corresponds to all of the specified search criteria includes an insulated hood, a belt, a motorcycle collar, and front pockets. The search button 310 is provided to allow the user to start a new search, though it is understood that other functionality may be provided as appropriate for a given implementation (e.g., a button to purchase the identified coat, etc.).

As such, and as described in association with FIG. 3A through FIG. 3F, users may specify searches using portions of images only. Additionally, multiple partial images may be utilized and prioritized to refine searches. Users may further learn search nomenclature and language using the multiple partial-image compositional search interface 300. Accordingly, the multiple partial-image compositional search interface 300 provides a flexible user interface that does not rely upon language skills or search nomenclature knowledge.

Accordingly, the present technology allows users to define interactive web searches by selecting multiple attributes (e.g., portions of images) from various image-based search results. Accordingly, users may be provided with technology to visually construct a complex search out of selections from multiple images, and may be provided an ability to refine searches and search results in an intuitive and flexible manner. Users may visually mash-up multiple, possibly unrelated, portions of visual search results into a new complex search that provides a fundamentally different kind of search experience for the user. The ability to rank and reprioritize the complex visual search criteria allows users to rapidly refine searches.

Figure 4:
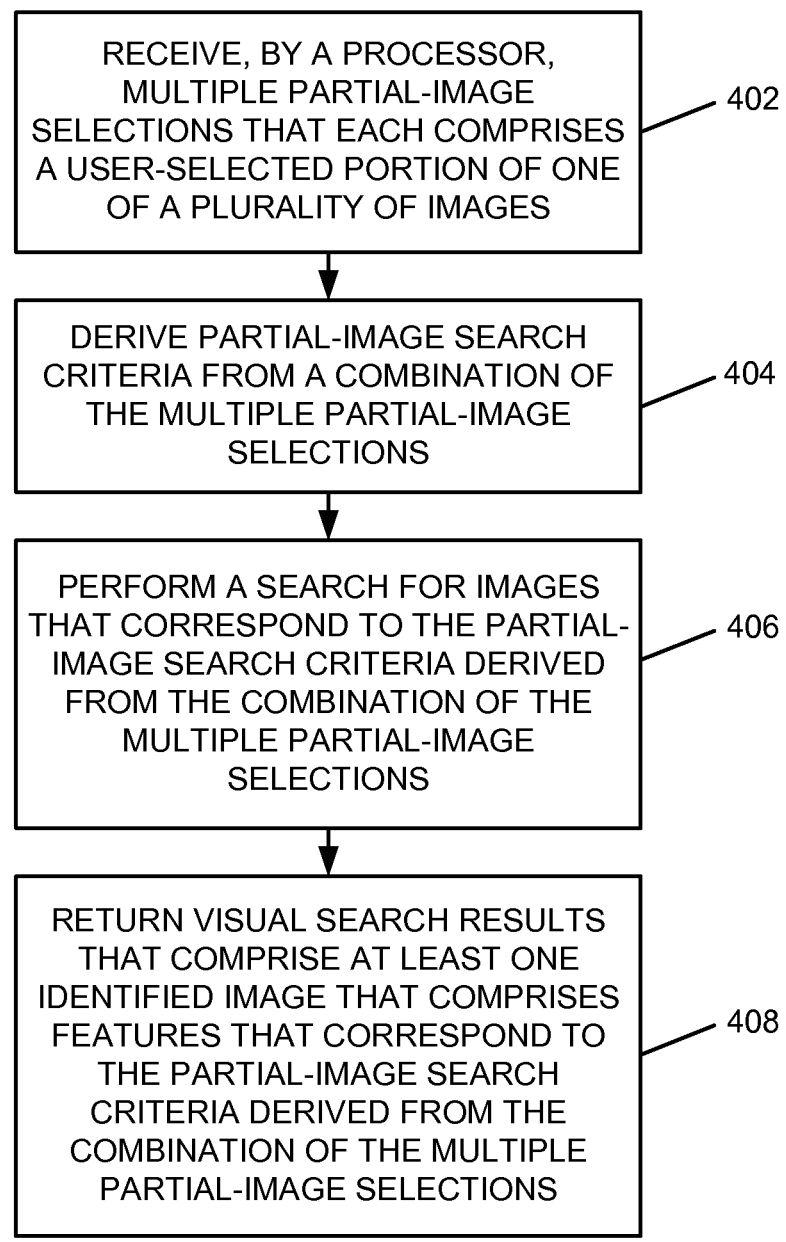
FIG. 4 is a flow chart of an example of an implementation of a process for multiple partial-image compositional searching according to an embodiment of the present subject matter.
Figure 5A:
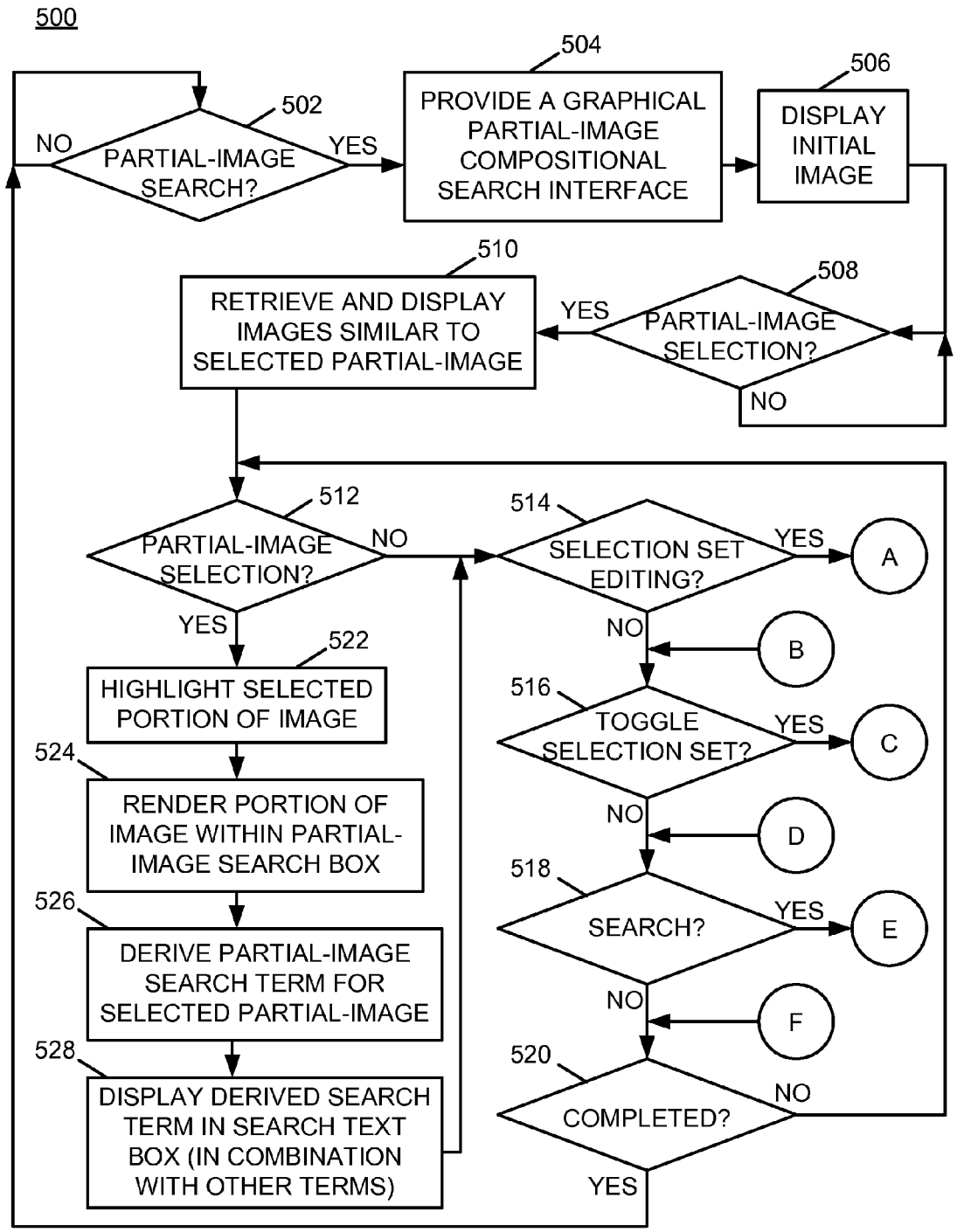
FIG. 5A is a flow chart of an example of an implementation of initial processing within a process for multiple partial-image compositional searching that allows partial-image search selection set editing according to an embodiment of the present subject matter.
Figure 5B:
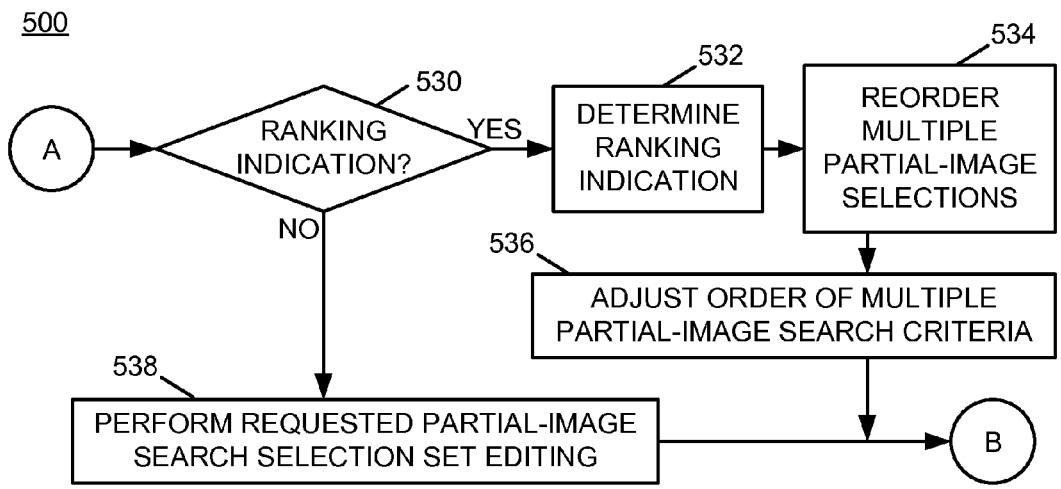
FIG. 5B is a flow chart of an example of an implementation of additional processing within the process for multiple partial-image compositional searching that allows partial-image search selection set editing according to an embodiment of the present subject matter.
Figure 5C:
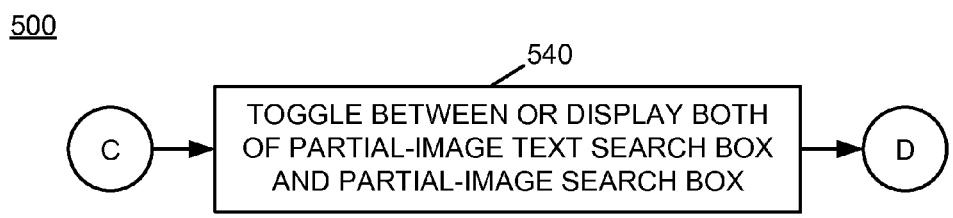
FIG. 5C is a flow chart of an example of an implementation of second additional processing within the process for multiple partial-image compositional searching that allows partial-image search selection set editing according to an embodiment of the present subject matter.
Figure 5D:
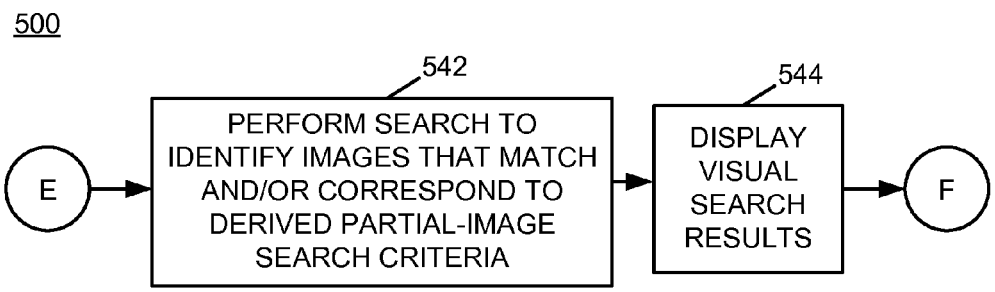
FIG. 5D is a flow chart of an example of an implementation of third additional processing within the process for multiple partial-image compositional searching that allows partial-image search selection set editing according to an embodiment of the present subject matter.

FIG. 4 through FIG. 5D described below represent example processes that may be executed by devices, such as the core processing module 200, to perform the automated multiple partial-image compositional searching associated with the present subject matter. Many other variations on the example processes are possible and all are considered within the scope of the present subject matter. The example processes may be performed by modules, such as the multiple partial-image compositional search module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 4 is a flow chart of an example of an implementation of a process 400 for multiple partial-image compositional searching. At block 402, the process 400 receives, by a processor, multiple partial-image selections that each comprise a user-selected portion of one of a plurality of images. At block 404, the process 400 derives partial-image search criteria from a combination of the multiple partial-image selections. At block 406, the process 400 performs a search for images that correspond to the partial-image search criteria derived from the combination of the multiple partial-image selections. At block 408, the process 400 returns visual search results that comprise at least one identified image that comprises features that correspond to the partial-image search criteria derived from the combination of the multiple partial-image selections.

FIGS. 5A-5D illustrate a flow chart of an example of an implementation of process 500 for multiple partial-image compositional searching that allows partial-image search selection set editing. FIG. 5A illustrates initial processing within the process 500. At decision point 502, the process 500 makes a determination as to whether a partial-image search has been initiated by a user. In response to determining at decision point 502 that a partial-image search has been initiated by user, the process 500 provides a graphical partial-image compositional search interface, such as the multiple partial-image compositional search interface 300, to the user at block 504. As described above, a user may be allowed via the graphical partial-image compositional search interface to visually mash up a partial-image search selection set that includes multiple partial-image selections. As described above, any image may be presented to the user for initial partial-image search specification/selection. As such, any image appropriate for a given implementation may be utilized.

At block 506, the process 500 displays an initial image to initiate partial-image selection and searching. At decision point 508, the process 500 makes a determination as to whether a partial-image selection has been detected. In response to determining at decision point 508 that a partial-image selection has been detected, the process 500 retrieves and displays images similar to the selected partial image at block 510.

At decision point 512, the process 500 makes a determination as to whether a partial-image selection has been detected in association with one of the displayed images. It should be understood that the process 500 iterates so that multiple partial-image selections from the graphical partial-image compositional search interface may be received. Additional processing associated with an affirmative determination at decision point 512 will be deferred and described in more detail below in favor of additional description of higher-level decision processing within the process 500. As such, in response to determining at decision point 512 that a partial-image selection has not been detected, the process 500 makes a determination at decision point 514 as to whether partial-image search selection set editing by the user has been detected. As described above, users may rank and prioritize selected partial images for further searching. Additional processing associated with an affirmative determination at decision point 514 and other higher-level decision processing will also be deferred and described in more detail below.

As such, in response to determining at decision point 514 that partial-image search selection set editing by the user has not been detected, the process 500 makes a determination at decision point 516 as to whether a toggle of the partial-image search selection set representation has been initiated by the user. As described above the user may toggle between images, text, or both representations for partial-image search criteria. Similarly, in response to determining at decision point 516 that a toggle of partial-image search selection set representation has not been initiated by a user, the process 500 makes a determination at decision point 518 as to whether an indication to invoke a search has been detected. In response to determining at decision point 518 that an indication to invoke a search has not been detected, the process 500 makes a determination at decision point 520 as to whether multiple partial-image searching has been completed. In response to determining that multiple partial-image searching has not been completed, the process 500 returns to decision point 512 and iterates as described above. With the higher-level iterative processing associated with the process 500 described, a description of affirmative processing at each of the respective decision points will now be described.

Returning to the description of decision point 512, in response to determining that a partial-image selection has been detected, the process 500 highlights the selected portion of the respective image at block 522. As described above, the user may be provided with feedback of the respective partial-image selection by use of highlighting via a dashed-line box, color, or any other form of highlighting as appropriate for a given implementation. At block 524, the process 500 renders the respective portion of the image within the partial-image search box, such as the partial-image search box 328. As additional partial image selections are detected, the process 500 displays partial images of each of the multiple partial-image selections in a sequence within a partial-image search box based upon an order of selection of respective portions of the plurality of images by the user.

At block 526, the process 500 derives a partial-image search term for the selected partial image. As described above, image recognition, edge detection, or other technologies may be used to derive a partial-image search term for the selected partial image. Alternatively, a database such as the partial-image database 112, a vendor text description of an image, or other technology may be utilized as appropriate for a given implementation.

At block 528, the process 500 displays the derived search term in the search text box, such as the search text box 326. As described above, the displayed derived search term may be displayed in combination with other search terms as additional selections of partial images from the user are detected. The process 500 returns to decision point 514 and iterates as described above.

Returning to the description of decision point 514, in response to determining that partial-image search selection set editing by the user has been detected, the process 500 transitions to the processing shown and described in association with FIG. 5B.

FIG. 5B illustrates additional processing associated with the process 500 for multiple partial-image compositional searching that allows partial-image search selection set editing. At decision point 530, the process 500 makes a determination as to whether the detected partial-image search selection set editing was a ranking indication detected in response to user adjustment of partial images or text within the graphical partial-image compositional search interface. For example, the process 500 may detect a user reordering of the displayed sequence of partial images within the partial-image search box. The process 500 may detect a user dragging, using a mouse, a partial-image search preference indicator (e.g., diamonds, hearts, etc.) onto at least a portion of one of the multiple partial-image selections.

In response to such a detection of a user reordering of the displayed sequence of partial images, the process 500 determines a ranking indication associated with the partial-image search preference indicator at block 532. At block 534, the process 500 reorders an order of the multiple partial-image selections based upon the determined ranking indication associated with the partial-image search preference indicator. At block 536, the process 500 adjusts an order of the partial-image search criteria based upon a combination of the user reordered displayed sequence of the partial images. As such, the process 500 allows the user to adjust relative positions of the multiple partial-image selections.

Returning to the description of decision point 530, in response to a determination that the detected partial-image search selection set editing is not a ranking indication detection, the process 500 performs the requested partial-image search selection set editing at block 538. For example, the user may have selected to delete one or more of the multiple partial-image selections within the partial-image search selection set to refine the partial-image search criteria, and the process 500 performs the requested editing.

In response to adjusting the order of the multiple partial-image search criteria at block 536, or in response to performing the requested partial-image search selection set editing at block 538, the process 500 returns to FIG. 5A to decision point 516 and iterates as described above.

Returning to the description of decision point 516 in FIG. 5A, in response to determining that a toggle of the partial-image search selection set representation has been initiated by the user, the process 500 transitions to the processing shown and described in association with FIG. 5C.

FIG. 5C illustrates second additional processing associated with the process 500 for multiple partial-image compositional searching that allows partial-image search selection set editing. At block 540, the process 500 processes the requested partial-image search selection set toggling by toggling between the partial-image search box and the partial-image text search box, or displaying both the partial-image search box and the partial-image text search box as described above. The process 500 returns to FIG. 5A to decision point 518 and iterates as described above.

Returning to the description of decision point 518 in FIG. 5A, in response to determining that an indication to invoke a search has been detected, the process 500 transitions to the processing shown and described in association with FIG. 5D.

FIG. 5D illustrates third additional processing associated with the process 500 for multiple partial-image compositional searching that allows partial-image search selection set editing. At block 542, the process 500 performs the requested search to identify images that match and/or correspond to the derived partial-image search criteria. At block 544, the process 500 displays visual search results to the user within the graphical partial-image compositional search interface. The process 500 returns to FIG. 5A to decision point 520 and iterates as described above.

Returning to the description of decision point 520 in FIG. 5A, in response to determining that processing has not been completed, the process 500 returns to decision point 512 to allow the user to perform additional ranking, prioritization, editing of the partial-image search selection set, selection of additional partial images, or other operations to further refine the multiple partial-image based compositional searching. In response to determining at decision point 520 that processing is completed, the process 500 returns to decision point 502 and iterates as described above.

As such, the process 500 allows a user to select portions of multiple images to initiate and refine search criteria. The user may edit the partial-image search selection set, prioritize and rank the partial-image search selection set, and perform other editing using images only if preferred. The user may further learn search nomenclature and terminology that may otherwise be unknown to the user so that searching is more efficient and so that desired search results are identified more rapidly.

Additionally, the process 500 allows users to learn one or more languages in association with graphical image-based searching. As such, by allowing use of only portions of images for search specification and search refinement, users are not bound by terminology or language constraints and can use recognizable portions of images to perform searching.

As described above in association with FIG. 1 through FIG. 5D, the example systems and processes provide multiple partial-image compositional searching. Many other variations and additional activities associated with multiple partial-image compositional searching are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A system, comprising:
   a display; and
   a processor programmed to:
      receive multiple partial-image selections that each comprises a user-selected portion of one of a plurality of images;
      derive partial-image search criteria from a combination of the multiple partial-image selections;
      perform a search for images that correspond to the partial-image search criteria derived from the combination of the multiple partial-image selections; and
      return, via the display, visual search results that comprise at least one identified image that comprises features that correspond to the partial-image search criteria derived from the combination of the multiple partial-image selections.

2. The system of claim 1, where the processor is further programmed to:
   provide a graphical multiple partial-image compositional search interface;
   allow, via the graphical multiple partial-image compositional search interface, a user to visually mash up a partial-image search selection set comprising the multiple partial-image selections; and
   where, in being programmed to receive the multiple partial-image selections that each comprise the user-selected portion of the one of the plurality of images, the processor is programmed to receive the multiple partial-image selections from the graphical multiple partial-image compositional search interface.

3. The system of claim 1, where the processor is further programmed to:
   detect partial-image search selection set editing by the user, comprising the processor being programmed to one of:
      detect a user adjustment of relative positions of the multiple partial-image selections; and
      detect a user deletion of at least one of the multiple partial-image selections; and
   refine the partial-image search criteria based upon the detected partial-image search selection set editing by the user.

4. The system of claim 1, where the processor is further programmed to:
   display, via the display, partial images of each of the multiple partial-image selections in a sequence within a partial-image search display area based upon an order of selection, by the user, of respective portions of the plurality of images;
   detect a user reordering of the displayed sequence of partial images within the partial-image search display area; and
   where, in being programmed to derive the partial-image search criteria from the combination of the multiple partial-image selections, the processor is programmed to adjust an ordering of the partial-image search criteria based upon a combination of the user reordered displayed sequence of the partial images.

5. The system of claim 1, further comprising an input device, and where the processor is further programmed to:
   detect a user dragging, using the input device, a partial-image search preference indicator onto at least a portion of one of the multiple partial-image selections;
   determine a ranking indication associated with the partial-image search preference indicator; and
   reorder the multiple partial-image selections based upon the determined ranking indication associated with the partial-image search preference indicator.

6. The system of claim 1, where the processor is further programmed to display, via the display, the derived partial-image search criteria as text in association with the multiple partial-image selections.

7. A computer program product, comprising:
   a computer readable storage medium having computer readable program code embodied therewith, where the computer readable program code when executed on a computer causes the computer to:
      receive multiple partial-image selections that each comprises a user-selected portion of one of a plurality of images;
      derive partial-image search criteria from a combination of the multiple partial-image selections;
      perform a search for images that correspond to the partial-image search criteria derived from the combination of the multiple partial-image selections; and
      return visual search results that comprise at least one identified image that comprises features that correspond to the partial-image search criteria derived from the combination of the multiple partial-image selections.

8. The computer program product of claim 7, where the computer readable program code when executed on the computer further causes the computer to:
   provide a graphical multiple partial-image compositional search interface;

allow, via the graphical multiple partial-image compositional search interface, a user to visually mash up a partial-image search selection set comprising the multiple partial-image selections; and where, in causing the computer to receive the multiple partial-image selections that each comprise the user-selected portion of the one of the plurality of images, the computer readable program code when executed on the computer causes the computer to receive the multiple partial-image selections from the graphical multiple partial-image compositional search interface.

9. The computer program product of claim 7, where the computer readable program code when executed on the computer further causes the computer to:
- detect partial-image search selection set editing by the user, comprising causing the computer to one of:
  - detect a user adjustment of relative positions of the multiple partial-image selections; and
  - detect a user deletion of at least one of the multiple partial-image selections; and
- refine the partial-image search criteria based upon the detected partial-image search selection set editing by the user.

10. The computer program product of claim 7, where the computer readable program code when executed on the computer further causes the computer to display partial images of each of the multiple partial-image selections in a sequence within a partial-image search display area based upon an order of selection, by the user, of respective portions of the plurality of images.

11. The computer program product of claim 10, where the computer readable program code when executed on the computer further causes the computer to:
- detect a user reordering of the displayed sequence of partial images within the partial-image search display area; and
- where, in causing the computer to derive the partial-image search criteria from the combination of the multiple partial-image selections, the computer readable program code when executed on the computer causes the computer to adjust an ordering of the partial-image search criteria based upon a combination of the user reordered displayed sequence of the partial images.

12. The computer program product of claim 7, where the computer readable program code when executed on the computer further causes the computer to:
- detect a user dragging, using an input device, a partial-image search preference indicator onto at least a portion of one of the multiple partial-image selections;
- determine a ranking indication associated with the partial-image search preference indicator; and
- reorder the multiple partial-image selections based upon the determined ranking indication associated with the partial-image search preference indicator.

13. The computer program product of claim 7, where the computer readable program code when executed on the computer further causes the computer to display the derived partial-image search criteria as text in association with the multiple partial-image selections.

\* \* \* \* \*